United States Patent [19] [11] 3,762,930
Mahlmann [45] Oct. 2, 1973

[54] MECHANICAL PRESSURE ROASTING OF COFFEE
[75] Inventor: James P. Mahlmann, Wayne, N.J.
[73] Assignee: General Foods Corporation, White Plains, N.J.
[22] Filed: Apr. 16, 1971
[21] Appl. No.: 134,867

[52] U.S. Cl. ............................. 99/68, 99/66, 99/71
[51] Int. Cl. .............................................. A23f 1/02
[58] Field of Search ...................... 99/68, 71, 69, 66

[56] References Cited
UNITED STATES PATENTS

| | | | |
|---|---|---|---|
| 2,282,708 | 5/1942 | Dantzig | 99/68 |
| 2,284,033 | 5/1942 | Berry | 99/69 |
| 3,655,398 | 4/1972 | Pitchon et al. | 99/71 |
| 3,458,320 | 7/1969 | Niven, Jr. | 99/71 |
| 3,640,726 | 2/1972 | Bolt et al. | 99/68 |
| 3,511,666 | 5/1970 | Hudson et al. | 99/66 X |
| 3,634,094 | 1/1972 | Ponzoni et al. | 99/68 |
| 2,716,936 | 9/1955 | Kopf | 99/68 X |

Primary Examiner—Frank W. Lutter
Assistant Examiner—William L. Mentlik
Attorney—Daniel J. Donovan and Thomas R. Savoie

[57] ABSTRACT

Green coffee either whole, flaked or ground is subjected to heat and a mechanical force preferably containing a shearing component sufficient to roast the coffee. The roasting produces a roasted coffee product having higher soluble solids whether atmospherically or pressure extracted compared to a conventional hot air roasts. The increased soluble solids content provides regular coffee wherein substantial reductions in the amount of coffee employed to prepare a brew are possible and in addition provides a soluble percolate of higher concentrations and at better yield in the manufacture of soluble coffee. The mechanical pressure roasting further provides improved controllable acidity but not in the order of that obtained by pressure roasting in the presence of large excesses of steam. The mechanical pressure roasting of coffee has been found to upgrade the flavor of Robusta-type coffees by removing typically tarry notes.

24 Claims, No Drawings

MECHANICAL PRESSURE ROASTING OF COFFEE

BACKGROUND OF THE INVENTION

This invention relates to pressure roasting of green coffee and more particularly to the roasting of green coffee subjected to a mechanical force. Still more particularly the invention relates to subjecting green coffee to a mechanical force having a compression force which results in compaction of the green coffee during the roasting process and preferably in addition a shearing force which insures uniformity of roasting and controllable development of flavor, soluble solids, acidity, and other characteristics of the roasted coffee.

Numerous roasting processes are known and employed in the roasting of green coffee beans. In conventional roasting the coffee beans are tumbled by mechanical means in the presence of hot gases which transfer heat to the coffee beans through the medium of convection and increase the temperature of the coffee beans to produce roasting to the desired color. Improvements in the conventional system have been made employing high velocity hot gases to fluidize the coffee during roasting and accomplish roasting in a period of several minutes or less. Such systems have been found to produce an improvement in the water soluble solids extractable from the roasted coffee.

Numerous patents describe variations of the commercial systems wherein the roasting gas is pressurized in order to lock in moisture and aroma which are liberated during the roasting process. Such systems are expensive to manufacture since the pressurized gases must be contained and in general give small improvements in the amount of available solids after roasting and small improvements, if any, in flavor. Still further modifications employ super-heated steam as the heat transfer medium and such systems are well described in the patent literature. These processes produce an appreciable increase in soluble solids but at the same time appreciably increase the total titratable acidity present in the roasted bean and decrease the pH of brews produced therefrom. While the improvement in soluble solids is a worthwhile and desirable goal, these processes have not been extensively employed since the type of acidity, and quantity of acidity developed during the roasting process has downgraded the flavor of the coffees processed to the point where they were not desired by the consumer.

The prior roasting processes have long sought a way of improving the development of soluble water solids produced in roasted coffee without adverse changes in acidity and pH which would make the beverage unacceptable to the consumer. The roasting art has long sought a pressure roasting process which could develop additional soluble solids without the need for excessive amounts of water present or heavy-duty roasters to contain the pressurized gas.

SUMMARY OF THE INVENTION

The general purpose of this invention is to provide roasted coffees of modified flavor and having a high soluble solids content without appreciable detrimental increases of total titratable acidity or pH of brews prepared therefrom and to provide a process for producing this new roasted coffee.

The roasted flavor modification and soluble solids improvements are achieved by subjecting green coffee beans, either whole, flaked, ground, or in any other convenient form to a mechanical pressure or direct force on the green coffee during the roasting process. The force applied preferably has components of both compression and shear, roasting being accomplished by the application of heat while the coffee beans are maintained under the mechanical pressure.

The mechanical pressure roasting of coffee produces an unexpectedly improved roasted flavor for brews and percolate produced from low grade coffees. In addition, for all types of coffee treated, mechanical pressure roasting produces large increases in water soluble coffee solids up to 75 percent improvement (about 5 to 10 percent absolute or greater), small and controllable increases in the acid level of the coffee, better control on the final roast color or degree of roast of the green coffee, rapid roasting of the coffee generally in minutes or less, and a compressive and shearing disruption of cell structure which increases the roasted and ground density and causes other improvements that flow directly from the application of a mechanical force to the green coffee bean during the roasting cycle.

It is the object of this invention to provide a pressure-roasting process developing sufficient pressure while controlling the amounts of water present during the roasting process.

It is a further object of this invention to provide a means for exerting a mechanical force of compression on green coffee beans during the roasting period in order to develop soluble solids and to modify the flavor of the coffees produced from the roast.

A still further object of this invention is to provide a means for exerting a mechanical pressure having force components of both compression and shear to compact and disrupt cells and to produce a mixing effect which insures a uniform roast, a more uniform development of flavor and other desired attributes of the roasting process compared to compression roasting alone.

DESCRIPTION OF THE INVENTION

The processes employed for the preparation of the new roasted coffee of this invention require that the green coffee, preferably whole bean, be subjected to a mechanical force containing at least a component of compression which compacts the green coffee and insures rapid heat transfer by conduction from heated surface contacting the green coffee to the surface of the green coffee. The mechanical compression force, in addition to increasing the density of the coffee being subjected to roasting, disrupts the cells' structure and produces changes in the final roasted product that have long been desirable in the coffee art. There is produced by compression roasting an increase in atmospherically available water soluble coffee solids of up to 10 percent or more absolute and there is produced comparable changes in the yield of soluble coffee prepared from this roasted coffee and in extract concentration.

The mechanical force may be applied by any of many well known techniques which have long been employed in other industries but have not apparently been used for the roasting of green coffee. Equipment such as hydraulic presses, compression rolls, or conventional extrusion equipment may be employed to develop the mechanical pressure necessary to carry out the processes of this invention.

It is a particularly preferred embodiment of this invention to apply a mechanical force having in addition to a component of compression, as that normally obtained in a hydraulic press, a force of shear such as that obtainable by using either screw or ram presses of the type employed in the plastics and food industries. The added component of shear produces a desirable mixing action cuasing fast transfer of heat from the heat transfer surface pressing against the coffee, which insures uniform roasting and uniform development of flavor, soluble solids, acidity, and the like.

The process of this invention has unique advantages in the processing of certain types of green coffee. For example, in addition to improving the final water soluble solids content of low grade coffees such as Robustas, there is produced a completely unexpected improvement in the roasted coffee flavor of these low grade coffees. The objectionable tarry flavor characteristic of this coffee is removed. This allows an increase of low cost or low grade coffees in both blends employed for regular coffee or for percolation in the production of soluble coffee. In addition, a controllable development of acidity allows a corresponding reduction in the amount of high grade or Colombian type coffees employed in a blend.

In dealing with moderate priced coffee such as those available from Brazil, a substantial increase in available water soluble solids is achieved while maintaining flavor at about that normally expected by the consumer.

Of course, in addition to the use of the mechanically pressure roasted coffee in blends, it is possible to make both regular and soluble products from a single variety of coffee employing the processes of this invention. Thus some of the cheaper types of vending machine coffee may be substantially improved in flavor by employing mechanical pressure roasting. In addition to improvement in flavor, increased soluble solids are obtained which allows reduction in the weight of roasted and ground coffee necessary to produce a brew having the desired concentration of coffee solids.

Mechanical pressure roasting is also useful for treating milds type coffee where certain changes are produced in roasted flavor that may be employed to modify the flavor of roasted and ground products or soluble coffee. In addition, available soluble solids are increased allowing reduction in the amount of roasted ground coffee necessary to produce a brew.

Mechanical pressure roasting is also employed along with adjusting the moisture content of the green coffee to produce a variety of new coffee flavors even when employing the high priced, Colombian type of green coffee. By judicious adjustment of moisture content it is possible to modify not only flavor but the extent of development of soluble solids and acidity developed.

The processes of this invention have a further advantage in the treatment of small and broken green coffee beans which are normally screened out prior to the conventional roasting of green coffee. Whereas small size coffee is burned and high roasting losses occur during conventional roasting, the processes of this invention allow roasting to be carried out without appreciable loss of solids or development of burnt flavors. For example, conventional roasts of small or broken coffee beans incur losses greater than 15 percent and many times nearly 30 percent of the total green coffee roasted, whereas the present invention allows roasting with a small incremental increase in roasting loss.

Prior to this invention, development of coffee-like flavor from flaked or ground roasted coffee was extremely difficult. There is a puffing effect during the conventional roasting of green coffee which is not apparently obtained when ground or when flaked green coffee is roasted in a conventional manner. The processes of this invention have particular applicability in this area since a direct compressive mechanical force is applied to the surfaces of the green subdivided coffee. Conduction of heat is rapid and roasting occurs in a short period of time. Apparently, the mechanical pressure exerted allows development of coffee-like flavors which have not heretofore been possible. Mechanical pressure with a force component causing shear of the green coffee is particularly preferred to provide better compaction, heat transfer, and uniformity of roast.

Mechanical pressure roasting provides a means for producing roasted coffee products from many waste products developed during the normal processing of coffee. For example, chaff and other materials normally removed prior to roasting can now be roasted through the use of mechanical force and heat. Green coffee can now be water extracted to remove green water solubles and caffeine, the caffeine removed, the green solids dehydrated and roasted by the processes of this invention.

Partially and totally extracted roasted coffee grounds can be re-processed to develop further soluble solids having coffee-like flavor, employing the processes of this invention.

In addition to processing normally waste products from coffee, it is now possible to extract materials such as caffeine, coffee oil, or other materials from the green coffee by first subdividing the coffee to insure substantial increases in the rate of extraction and degree of extraction. Once extraction is completed it is now possible, by the pressure roasting techniques of this invention, to develop regular coffee flavor which has not heretofore been possible. For example, green coffee may now be flaked as is done in the soybean industry, extracted with a solvent having affinity for fat or oils such as benzene, hexane, trichlorethylene or the like, treated to remove the solvent, dehydrated to the best moisture content for flavor development, and mechanically pressure roasted to develop a desirable roasted coffee flavor and a product having high soluble solids content. Green coffee can also be subdivided and the caffeine content removed by contact with either an aqueous or organic solvent by methods generally known in the art. On removal of solvent residues, the green coffee can now be roasted under pressures sufficient to develop desirable coffee flavor and soluble solids. The dividing of green coffee beans not only speeds the rate of extraction but reduces the amount of time under which the green coffee bean is subjected to heat and other process variables which adversely affect the flavor of coffee. Thus substantial improvements in flavor, soluble solids and other properties are possible by the application of the processes of this invention to ground, flaked, or otherwise subdivided green coffee beans.

Mechanical pressure roasting can be applied to any whole green or subdivided green coffee whether decaffeinated or otherwise treated or not. Another advantage of this invention is the ability to reduce roasting loss normally occurring in hot air roasting by the application of mechanical pressure roasting. The exact mechanism is not understood, but is is believed that the mechanical pressure applied directly to the surfaces of the beans traps about them and within them materials that are normally lost in the conventional roasting of coffee. In addition, closer control of roasting temperature is possible resulting in a reduction of the variability in roast color and the number of roasts that are normally burned during the commercial production of coffee.

Another chief advantage of this process is the possibility of producing new forms of roasted coffee by pressing or otherwise molding the roasted coffee into desired shapes. For example, pellets, doughnuts, or other geometric shapes of roasted coffee can be prepared by mechanical pressure roasting such as in a heated press or in an extruder employing a die to shape the final product. Mechanically pressure roasted coffee is advantageous used in tea type bags and others such as Max-Pax brand regular coffee to give faster extraction of solids and greater brew concentration.

As has been noted, the density of mechanical pressure roasted coffee is generally greater than that of conventionally roasted coffee. This is a desirable attribute for in addition to improved soluble solids content, there is a visual appearance that less coffee is being employed. This could also be a drawback, however, in producing normal roasted and ground coffee by this technique since the consumer has been accustomed to a certain density of coffee. The density differences can be overcome by subjecting the roasted coffee to further processing. For example, modification of conventional grinding of coffee will produce a lighter density. If grinding is not sufficient, the further reduction in density can be attained by subjecting the coffee to a vacuum or quickly releasing the mechanically pressure roasted coffee from a pressurized system into the atmosphere or vacuum. If desired, agglomeration can also be employed to modify the density of the ground product.

A desirable advantage of this invention is to partially roast green coffee employing mechanical pressure to a light roast color and then complete the roast using conventional hot air equipment. Alternatively, a complete mechanical pressure roasting may be followed by treatment with hot air, steam or the like to modify the roasted flavor such as by reducing the acid content of the roasted product.

The processes of this invention are carried out by subjecting green coffee to a mechanical pressure and by supplying heat by conduction directly to the green coffee beans. The combination of mechanical pressure and conductive heat insures a rapid roasting of the green coffee and development of desirable coffee flavors as well as substantial improvements in water soluble roasted coffee solids. For example, whole green coffee beans may be fed to an extruder having a heated barrel and heated shaft if desired. The beans are moved and mixed by the rotating shaft and heated by the hot walls contacting the coffee. Desirably, there is designed into the extrusion equipment a reduction in the volume during extrusion which causes compaction of the coffee and shearing of the coffee during roasting. This insures rapid and uniform roasting and improves the soluble solids content obtained from the coffee. It is possible, however, to design the extrusion equipment so that the normal expansion of the green coffee during the roasting process causes the free volume within the extruder to be reduced to the point where there is a compression effect simply due to the green coffee swelling and puffing without adequate volume to do so. Alternatively, green or roasted coffee may be placed between heated platens which are then brought together, sandwiching the coffee between the plates. The coffee is subjected to the direct compression, and heat is transferred from the hot plates by conduction to the surfaces of the coffee. Again, rapid roasting takes place with substantial development of increased soluble solids content and modification of flavors. The type of equipment employed is not critical. However, it is preferred to subject the green coffee to mechanical forces of both compression and shear to insure uniformity of roasting and full development of the attributes produced by this invention, namely, improved soluble solids, flavor modification, acid development, and the like. For purposes of obtaining both compressive and shear force, the extrusion of coffee is preferred since the rotating or plunging auger of the extruder both compacts and shears the coffee at least to the point of flattening and tearing a portion of the beans being roasted. The use of extrusion equipment also allows numerous variations in the design of the equipment to produce desirable results.

For example, green coffee, when fed into the extruder, may be subjected to an inert atmosphere such as nitrogen, carbon dioxide, or the like, which will purge the oxygen from the extruder and insure mechanical roasting in an inert atmosphere. By control of the quantity of the inert gas and coffee, substantial amounts of oxygen present during roasting may be removed. In addition, an inert gas purge can be employed to modify the amount of water vapor present in the roasting atmosphere. If development of acidity is not desirable, water vapor which contributes to acidity development can be removed by a gas purge.

Where sourness is not objectionable, the inert gas purge could be employed as a carrier for additional water vapors to be added to the roasting environment. Control of the water and oxygen present during the roasting by control of the gaseous atmosphere present is easily obtained during extrusion roasting.

The extruder may also be modified by incorporating standard sections, anywhere on the barrel, for the application of a vacuum source to the system as is done in the production of certain food products, such as pasta products. This vacuum section could be employed to remove oxygen and water vapor or control the same as is done with the inert purge.

In addition to control of the roaster environment, the use of vacuum or inert gas may be employed to collect desirable aromas liberated during the roasting. This again is conveniently done in the extruder where aroma collection can be precisely located. For example, grinder gas developed during the roasting can be removed by application of a vacuum in the initial portions of the roasting section of the extruder. Roaster gases can be removed at the discharge or near the discharge end of the extruder. When roasting low cost coffee such as Robustas, selection of specific points in the roasting process can be employed to remove undesirable flavor fractions from the roaster environment. Thus a vacuum source can be attached to the extruder and used to remove the undesirable aroma components as they are developed during the roaster process. Of course, combinations of inert gas purge and vacuum techniques can be employed where desirable.

A further advantage of applying mechanical pressure in an extruder is the development of heat due to the compaction occurring within the extruder itself. Therefore, in addition to applying heat to either the barrel or the rotating or reciprocating auger, it is possible to reduce the volume of the free area of the extruder and therefore compact the coffee during roasting. The compaction and shearing force generates heat which in itself aids in the development of the desirable coffee flavor and soluble solids produced by the processes of this invention.

A further advantage of employing extrusion roasting is to simultaneously roast coffee and remove roasted coffee oil from the roasted product. This allows recution of the normal oil content of the roasted coffee and produces a source of aroma which may be either returned to the resulting coffee product or may be treated to isolate desirable flavor fractions which are in turn returned to the product. Oil removal can be attained by fitting the heated barrel at the discharge end with a barrel of the type employed in expellers so that oil is easily removed.

Mechanical pressure roasting has particular significance in reducing roasting time to five minutes or less, and preferably from between two minutes to a matter of seconds.

In the examples that follow, green coffee is mechanically pressure roasted under conditions of both mechanical compression and shear employing a Model 250 Extruder ¾ inch, Catalog No. 39B, manufactured by C. W. Brabender Instruments, Incorporated, of South Hackensack, New Jersey and described in bulletin LE 68. The extruder is recommended for plastics applications and has a ¾ inch barrel opening and a screw length to barrel diameter of 25/1 (L/D). The extruder barrel has three electric band heaters, 600 watts each. Temperature control is accomplished using a Model 2500 extruder temperature control console manufactured by Brabender which has four heat zones, three for the barrel and one for the die heater, when used, and four controllers for regulating barrel temperature up to 842°C.

Coffee is placed in a small hopper cooperating with the opening to the extruder barrel. The coffee is pressed, using hand force on a ram between the rotating flights of the extruder screw.

The coffee is conveyed by the rotating screw (auger) through the heated barrel of the extruder and allowed to discharge at the end of the screw. No die is employed but could be to exert greater mechanical force. Mechanical force is achieved by the natural expanding of the coffee as it roasts and by a tapering of the extruder shaft (where tapered shafts are employed) which reduces the free volume between the barrel and screw. Screws with a 1/1, 2/1 (Cat. No. 39–8A) and 3/1 (Cat. No. 39–8B) compression ratio are employed and others are readily available at higher compression ratios. The extruder screws or augers are chrome-plated stainless steel, single flight, uniform pitch, having a feed depth of 0.150 inches. The screw has 25 flights.

The feed rate of coffee passing through the extruder is regulated using a variable speed drive and there is a device for measuring the motor load in amperes. Each of the barrel temperatures, zone No. 1, closest to the feed, zone No. 2, intermediate between feed ad discharge, and zone No. 3 at the discharge end of the extruder are pre-set for the desired roasting temperature.

The rate of coffee passing through the extruder is measured by weighing coffee into, and out of the extruder. Green coffee is roasted within the heated barrel to any desired degree of roast. Conditions of flow rate, mechanical pressure, and temperature are easily adjusted to give coffee of a specific roast color. Good grade coffees, such as Colombians, are normally roasted to a low coffee color while low grade coffee such as African or Indonesian Robustas are roasted to a light color.

The color of coffee is determined by grinding the roasted coffee and screening it using U.S. No. 50 and pan. The portion that passes through U.S. No. 50 and is retained on pan is collected, placed in a container of 1 ½ inch diameter and ½ inch deep and pressed under 1,200 psi with a 1 ⅜ inch ram. The pressed coffee is placed beneath a photoelectric search unit of the color measuring device and the difference in reflected light at 595 mu between a standard color plate and the coffee is indicated as color units on the scale of that instrument. When a lightly roasted coffee is placed beneath the search unit, the light reflectance is greater than the standard and the needle moves to a higher reading.

The color measuring device is a photoelectric reflection Model 610 having a Model y10–Y search unit, manufactured by Photovolt Company. The standard color plate employed is a ceramic plate of brown color and hue. The standard brown plate exhibits the following reflection curve using magnesium oxide to represent 100 percent reflection.

REFLECTANCE

| Wave Length mu | Percent Reflection % |
|---|---|
| 580 | 14.0 |
| 600 | 17.0 |
| 620 | 21.4 |
| 650 | 26.0 |
| 700 | 24.3 |

The roasted and ground samples are evaluated for flavor at a standard cup concentration of 1.35 percent coffee soluble solids in the beverage. This is necessary since mechanical pressure roasting develops far greater water soluble solids than conventional air roasting and if adjustment of concentration is not made, the mechanical pressure roasted coffee flavor is too strong.

Brew solids are determined using a coffee hydrometer, described in "The Direct Reading Coffee Hydrometer," publication No. 61, The Coffee Brewing Center, New York, New York (1970).

The roasted coffee available soluble solids are determined by grinding roasted coffee beans using the Hobart grinder to drip grind. Using a set of Tyler sieves, arranged as No. 14, No. 20 and pan, the sample is screened, and the No. 20 screen fraction removed. The No. 20 fraction is used to determine the soluble solids. Approximately 5 ± 0.0001 gms. of No. 20 screen fraction sample is transferred into a 125 ml. Florence flask by means of a brush. 75 mls. of distilled water are added. The flask is connected to a water jacketed condenser and reflux for 2 ½ hours. The resulting mixture is cooled and pressure filtered using Celite filter aid into a 200 ml. volumetric flask. Sufficient distilled water is added for two additional washings of the grounds. The contents of the volumetric flask are brought up to volume with distilled water. Using a 25 ml. volumetric pipette, the sample is transferred to a tared aluminum dish containing sand which has been previously weighed to the nearest 0.01 milligram. The contents are evaporated to near dryness on a steam bath, removed from steam bath, and further dehydrated in a vacuum oven maintained at 25 inch Hg and 70°C. The sample is removed from the vacuum oven, cooled in a desiccator and weighed on analytical balance to nearest 0.1 mg. The soluble solids content is determined by the following calculations:

A. (Final Wgt. − Initial Wgt.) = Wgt. of Soluble Solids residue in 25 ml.

B.
$$\frac{(\text{Wt. of residue})(200)(100)}{(\text{Wt. of sample})(25)} = \text{Soluble solids (as in basis)}$$

C.
$$\frac{\text{Percent soluble solids}}{\left(1.00 - \frac{\% H_2O}{100}\right)} = \text{Soluble solids (dry basis)}$$

pH and titratable acidity tests are run by preparing coffee brews by conventional techniques and measuring the total solids content of the brew. After cooling the brew to room temperature, 100 ml. of the brew solution is transferred into a 200 ml. beaker. A pH meter is calibrated using two known previously prepared buffer solutions. After rinsing the electrodes with distilled water, the electrodes are immersed in the coffee solution to be analyzed. The initial pH is read and recorded. The brew is titrated with a 0.1N sodium hydroxide solution until the meter reads pH 8.10 and the ml. of hydroxide solution determined and recorded. The titratable acidity is calculated by the following formula:

$$\text{T.A. mls.} = \frac{(\text{Titration in mls.})(\text{Normality of NaOH used})(1.5\% \text{ solids})}{(0.1 \text{ N NaOH})(\text{Percent total solids})}$$

Roasting loss, as is and dry basis, is calculated from the coffee weight processed and recovered and the moisture content of the beans. Moisture content is determined by oven moisture by weighing about 5 to 10 grams of whole bean or ground coffee (green or roasted) to the nearest 0.1 mg. into a previously tared aluminum dish with cover. The sample is placed in a forced draft oven at 110°C for 16 hours, then removed from oven, cooled in a desiccator and weighed. The moisture is calculated as follows:

Wgt. of Sample = (Gross Wgt. before drying)−(Tare Wgt.)

Loss in Wgt. = (Gross Wgt. before drying)−(Gross Wgt. after drying)

% $H_2O$ = [(Loss of Wgt.) (100)]/(Wgt. of Sample)

Control roasts are made using a standard one pound Probat roaster.

The temperature of the extruder surfaces contacting the bean is not critical provided a sufficient temperature of, say about 375°F, is employed to develop the desired roast color. High temperatures may be employed provided sufficient shearing force is applied to uniformly mix the beans and prevent local burning. This is achieved by either providing a limited area between the heated surfaces and the coffee or by providing mixing zones within the extruder to continually mix the beans during roasting.

Roasts made by mechanical pressure roasting have substantially higher soluble solids than Thermalo or Probat roasted coffee. The soluble solids content of the coffee produced by this invention isnormally greater than 30 percent and more generally from 30 to 41 percent, whereas conventional roasts contain a soluble solids content of from 24 to 28 percent. Substantially greater cup strength is produced by mechanical pressure roasting as determined by either expert tasters or the consumer. Thus mechanical pressured roasted coffee, when prepared at a recipe level of from 90 percent to less than 75 percent, depending upon the type of coffee employed, can equal cup strength produced from normal roasts employing a Thermalo roaster at 100 percent recipe level. In addition, the processes of this invention substantially upgrade the roasted flavor of low cost or low quality coffees such as Robustas, or the like. The flavor quality of Brazilian or Santos beans is at least as good as the conventional roasts while the high grade and expensive coffees are modified in flavor but have substantially improved soluble solids content. Furthermore, the higher grade coffees after development of higher soluble solids can be later treated to reduce acidity, if desired, as was taught by post-treatment patents dealing with steam, pressure roasting of coffee.

Mechanical pressure roasting conditions are characterized by a confined atmosphere in the application of both mechanical and gas pressure, with mechanical pressure being predominant; and by heat transfer by means of conduction with some transfer by air and evolved gas convection. The mechanical pressure roasting of this invention also subjects the beans to compressive and shearing forces which disrupt cell structure and aid in compression of the coffee and improve the uniformity of roast color development during roasting. It appears that this combination of compressive and shearing forces and conductive heat transfer directly to the green coffee bean produces a highly novel reoasted coffee having desirable flavor and improved characteristics such as soluble solids content.

Having described the general means for practicing this invention, there follows specific examples which should not be construed to limit the invention in any manner whatsoever but are intended merely to show practical applications of this invention:

EXAMPLE I

Green coffee beans and ground green coffee beans were each processed through a heated laboratory extruder. The screw was approximately 7.5 inches long and three-fourths inches in diameter. The barrel was heated with electrical heaters to a temperature between 400°F to 500°F. In some experiments, an additional heating zone was added by attaching a heated die to the end of the barrel. The coffee was fed through the extruder at a rate of 60 grams per minute at a screw speed of 50 R.P.M. Roasted product temperatures ranged from approximately 480°F to 535°F and the coffee exited from a 0.5 inch die in the form of a cylinder of coffee roasted to a degree where roast coffee flavor was developed. This experiment established that coffee beans, either whole beans, flaked, or ground, could be roasted in a confined volume under mechanical pressure to generate roasted coffee flavor and produce a finished product having a new form and flavor. By application of mechanical pressure to green coffee with heat, there is produced new roasted coffee products which can be employed as regular coffee or further processed into a soluble coffee. The above process may also be used to apply heat and mechanical pressure, with or without the addition of water, to upgrade low quality coffees.

The pressures employed in the above extrusion roasting were measured and generally fell between 300–800 psig.

EXAMPLE II

A series of roasts were made employing the Brabender extruder, Model 250, described in the specification.

Three augers—1/1, 2/1, and 3/1—were employed. The 1/1 auger is constructed so that if there is no change in the free volume, between heated barrel and auger, within the extruder. The 2/1 ratio auger is evenly tapered from feed to dishcarge, having a reduction in the free volume within the extruder of one-half the feed volume at the discharge end. The 3/1 auger reduces the free volume within the barrel at the discharge end to one-third of the volume at the feed end.

Robusta type coffee from the Cameroons was employed in this experiment. For each auger a series of auger speeds were employed to vary the flow rate of coffee fed through the extruder and the retention time within the extruder. The barrel of the extruder was divided into three heated sections. The first section closest to the feed port was maintained at 400°F, the second or middle section was maintained at 425°F, and the third section just immediate to the discharge was maintained at 475°F. No die was employed in this extruder and pressure was developed through the expansion of the beans during roasting, and the reduction in free volume between the extruder barrel and auger for two of the three augers employed. The final temperature of the roasted coffee was measured as it discharged from the extruder and the feed rate and discharge rate of coffee recorded as well as the roast color of the final roasted coffee. Moisture data was obtained from the green and roasted coffee and roasting loss (as and dry basis) was calculated for certain of the runs. pH and titratable acidity values were determined as well as soluble solids and brews solids. The results of the various experiments are tabulated below:

| Auger Ratio: 3/1 | | | | |
|---|---|---|---|---|
| auger speed R.P.M. | 40 | 50 | 60 | 70 probat control |
| Roasted Coffee Discharge Temperature (°F) | 425 | 432 | 437 | 446 |
| Feed Rate (lbs./hr) | 5.2 | 6.3 | 7.1 | 6.6 |
| Discharge Rate (lbs/hr) | 4.4 | 5,8 | 6.5 | 6.0 |
| Roast Color | 59 | 74 | 82 | 80 |
| % Roasting Loss (as is/ dry basis) | 6.6/3.7 | 8.1/5.2 | 8.1/5.9 | 8.8/5.6 |
| pH/TA | 4.5/17.6 | 4.7/14.9 | 4.8/14.9 | 4.8/15.5 |
| Soluble Solids Brew/Available Soluble Solids | 1.26/33.9 | 1.21/31.4 | 1.21/30.3 | 1.16/29.4 |

| Auger Ratio: 2/1 | | | Auger Ratio: 1/1 |
|---|---|---|---|
| auger speed R.P.M. | 40 | 50  60 | 40 |
| Roasted Coffee Discharge Temperature (°F) | 428 | 436 | 338 |
| Feed Rate (lbs/hr) | 5.5 | 6.2 | |
| Discharge Rate (lbs/hr) | 5.1 | 5.8 | green, |
| Roast Color | 54 | 55  58 | not |
| % Roasting Loss (as is/ dry basis) | 7.0/– | 6.5/– –/– | roasted |
| pH/TA | –/– | –/– –/– | |
| Soluble Solids Available | 34.6 | 32.1 – | |

A comparison of the data for augers 3/1 and 2/1 indicates that at the same feed rate of green coffee and equivalent temperature within the extruder barrel, a lighter roast color is developed for the auger with the greatest reduction in volume, namely, the 3/1 auger. This appears to be due to a reduction in retention time of the coffee passing through the heated extruder. At equivalent roast colors, however, there is a trend to higher soluble solids content as the mechanical pressure applied to the coffee is increased. Also, a comparison of the roasted beans indicates the 3/1 auger roasted beans developed a roast of more uniform character. The 1/1 ratio auger did not roast at the temperatures employed, most likely due to the absence of any appreciable shearing action. Heat transfer appears to increase as the mechanical pressure increases. In addition, the working of the coffee under compression and shear, the 2/1 and 3/1 ratio augers also generate heat which contributes to roasting. The net result is faster, more uniform roasts of the green coffee under increased mechanical pressure.

Characteristic of the coffee produced by this invention is the shiny compressed surface of the roasted coffee compared to the normally dull, brownish color of conventionally air roasted coffee. Surface characteristics indicate that mechanical compression and shear while roasting has compressed and flattened the coffee and has produced a very shiny surface characteristic.

Looking at the data for single auger roasts, one notes roast color to be a funtion of the time the coffee is subjected to the roasting temperature. Roasting losses are seen to generally increase as roast color is decreased. Similarly, the lowest pH of brews and the highest titratable acidity are found in the samples roasted to the lowest color. The soluble solids are also seen to increase with the darkening of the coffee roast color. Roasting color appears to be a function of the time the coffee is subjected to the constant temperature within the extruder.

EXAMPLE III

In an attempt to separate each of the variables affecting roasting under mechanical pressure, a hydraulic, heated press was employed having forces of compression but not shear.

A Pasadena hydraulic press having a fluid operated high pressure ram capable of exerting a force of 70 tons between 200 square inch heating plates equipped with temperature control, was employed to determine the effect of processing variables. The press permitted a high degree of control on roasting conditions, since it is equipped with automatic pressure and temperature regulation, but suffers from the defect of being a compaction or compression roaster only and does not provide the benefits obtained by having a component of force causing shearing of the green coffee bean during roasting.

Samples were prepared by mixing green coffee beans with dry ice, and grinding in a Fitzpatrick comminuting machine using a No. 1 screen. After sublimation of the dry ice, the green coffee was ready for pressure roasting.

When a reduction in moisture was desired, the ground coffee was spread on flat trays and placed in a Youngs Brothers drier at 140°F for a time sufficient to remove the desired amount of moisture.

After grinding 100 grams of ground green coffee were spread evenly and thinly on a layer of cheesecloth on the top of a piece of aluminum foil. The cheesecloth and foil are folded over so as to make a 10 by 10 inch flat packet with aluminum foil on the outside. This packet was cold pressed in the Pasadena press to evenly distribute the coffee. To accomplish roasting, the packet containing green coffee was placed between the preheated plates of the press and pressed. Thus at a ram force of 70 tons, the actual pressure on the 100 square inch packet was 1,400 psig. This pressure was employed except where noted otherwise.

During the entire course of roasting, the packet remained sealed but on release of the ram the packet exploded at the seal of aluminum foil, indicating gas pressure buildup within the roaster. The gas pressure within the packet was measured and found to be generally within 200 to 300 psig by the end of roasting. The following variables were investigated: green bean moisture, green bean particle size, ram temperature, ram pressure, and roasting time.

Roasting Time. Medellin coffee was roasted by the preceding method. An increase in the roasting time was found to give roasts with greater cup strength and higher soluble solids with optimum coffee flavor depending upon other variables in addition to the roast time. The roast time was varied from 75 to 180 seconds. At the upper end of the time cycle, namely 180 seconds, objectionable burned notes were noted on flavor evaluation. This is due to the use of compression only. Mechanical shear has been found to improve the uniformity of roast. The effect of roast time on certain brew roast qualities is summarized below:

| Roast Time (seconds) | 80 | 90 | 105 |
|---|---|---|---|
| Green Bean Moisture (%) | 4.8 | 4.8 | 4.8 |
| Ram Temperature (°F) | 410 | 410 | 410 |
| Ram Pressure (psig) | 1400 | 1400 | 1400 |
| Roast Bean Soluble* Solids (%) | 35.5 | 36.0 | 37.4 |
| Flavor Quality** | 3.8 | 4.5 | 3.9 |
| Cup Strength** | 4.1 | 5.0 | 5.5 |

* Roast bean moisture of approximately 4%
** 65% recipe level

An expert panel of coffee testers employed the following system in evaluating flavor and cup strength of Pasadena roasted beans compared to a conventionally roasted Thermolo roast control:

| Quantitative Rating | |
|---|---|
| Extremely more or better | 9 |
| Very much more or better | 8 |
| Moderately more or better | 7 |
| Slightly more or better | 6 |
| Control | 5 |
| Slightly less or worse | 4 |
| Moderately less or worse | 3 |
| Very much less or worse | 2 |
| Extremely less or worse | 1 |

Due to their generally high cup strength, the samples were prepared at 65 percent recipe level. A comparison of the Pasadena roasts to the extrusion roasts indicates higher soluble solids development with longer Pasadena roast times which correspond to the higher soluble solids development in the extruder roasts at longer roast times.

Temperature. The Pasadena ram press was capable at roasting at between 380° to 430°F. At the lower end of temperature, the product was under-roasted, while at the upper end, predominantly burned notes were obtained. Considerably more flexibility is possible using mechanical devices which develop a shearing force during roasting. The following data was obtained when roasting Medellin green coffee.

| Ram Temperature (°F) | 390 | 410 | 420 | 390 | 410 | 420 |
|---|---|---|---|---|---|---|
| Moisture of Green Beans (%) | 5.6 | 5.6 | 5.6 | 6.9 | 6.9 | 6.9 |
| Roast Time (Seconds) | 150 | 110 | 105 | 180 | 110 | 105 |
| Ram Pressure (psig) | 1400 | 1400 | 1400 | 1400 | 1400 | 1400 |
| Roast Bean Soluble Solids (%) | 35.4 | 37.0 | 36.9 | 36.8 | 38.9 | 39.5 |
| Flavor Quality** | 4.0 | 3.8 | 4.0 | 3.8 | 3.5 | 3.0 |
| Cup Strength** | 5.0 | 5.5 | 5.5 | 6.0 | 7.0 | 8.0 |

** 65% Recipe Level

The results from the previous section where roasting time was the only variable showed an increase in soluble solids and cup strength as the roasting time increased which was similar to that found in extrusion roasting. While the roasting time as well as the ram temperature was varied in the experiments, it can be seen that an increase in the ram temperature gave greater soluble solids and cup strength even though the roasting times were at the same time reduced.

Green Bean Moisture Content. The moisture level in the ground green beans prior to roasting affects a number of roasted bean characteristics, some to a marked degree. Control of green coffee bean moisture content can be employed to control the degree of acidity and soluble solids development when roasting a variety or blend of coffee. Where little or no development of acidity is desired, the green coffee should be dehydrated to reduce the as is moisture content of the coffee prior to mechanical roasting. Where development of acidity and high soluble solids content is desired, the green coffee beans should be hydrated. Modification of the green bean moisture content provides an opportunity to produce any degree of acidity desired. Modification of green bean moisture prior to roasting can be employed for high cost coffees such as Columbians, medium cost coffees such as those from Brazil or low cost coffees such as Robustas. The exact moisture content for a given variety of coffee or blend is easily determined and depends to some extent on the other conditions employed in mechanical roasting.

The data on the following page was obtained for Medellin green beans:

| | Thermalo Control | Pasadena Roasts | | | | |
|---|---|---|---|---|---|---|
| Moisture of Ground Green Beans (%) | 10.1 | 1.2 | 3.1 | 4.3 | 5.6 | 6.2 | 10.1 |
| Roast Time (seconds) | | 110 | 110 | 110 | 110 | 110 | 110 |
| Ram Temperature (°F) | | 410 | 410 | 410 | 410 | 410 | 410 |
| Ram Pressure (psig) | | 1400 | 1400 | 1400 | 1400 | 1400 | 1400 |
| Roast Bean Color | 59 | 41 | | | | 35 | 39 |
| Roast Bean Soluble Solids (%) | 26.1 | 33.9 | 35.2 | | 37.0 | 39.3 | 39.3 |
| Flavor Quality** | 5 | 3.4 | 4.2 | 3.8 | 3.8 | 3.4 | 2.6 |
| Cup Strength** | 5 | 4.6 | 5.0 | 5.5 | 5.5 | 6.0 | 7.2 |

| | | | | | |
|---|---|---|---|---|---|
| Acid Flavor Note** | 5 | 4.6 | | 5.8 | 8.0 |
| pH of Brew** | 4.90 | 5.00 | | 4.75 | 4.58 |

** 65% recipe level except for control

As can be seen from the above table, a positive correlation was found between initial moisture level and acid flavor level in the roasted beans. Green bean, as is, with a moisture content of about 10 percent, produced brewed coffee with a high acid flavor level. Reduction in green bean moisture down to about 1 percent, markedly reduced the acid flavor levels produced.

Trained flavor panel evaluations were consistent with pH measurements which showed an increase in pH with decreasing green moisture content levels. As noted previously, the aluminum foil packet containing the coffee did not rupture until the ram was released at the end of the roast; and, therefore, unlike conventional themalo roasting, the moisture present in the green beans remained in immediate roasting vicinity throughout the roasting cycle. This moisture probably exists in both the liquid state within the beans, and gaseous state in the free area of the packet. Over the moisture range studied, higher moistures gave higher soluble solids and greater cup strength.

Application of the same techniques to Robusta beans, where acid development is desirable, improves flavor while at the same time improves soluble solids and cup strength. It is apparent that bean moisture content should be regulated depending on the type of the bean roasted, with high quality beans being roasted at lower moisture content than conventionally employed, and low quality beans roasted at moisture contents greater than normally employed to control the acid development in the final roast.

The effect of moisture content on green whole Robusta beans was evaluated by adding moisture to the green bean (6% $H_2O$), and allowing the beans to equilibrate. The beans were then roasted in the Brabender extruder as in Example II employing a 3/1 auger and barrel temperatures of 375°F at the feed end, 400°F intermediate, and 475°F at the discharge end. Control roasts were made using a one pound Probat roaster.

| | | Roasted | | |
|---|---|---|---|---|
| Control 1 lb. Probat roast | R.C. | Percent $H_2O$* | Percent S.S. | T.A. |
| a.......... 6% $H_2O$ green........ | 58 | 1.90 | 24.6 | 10.0 |
| b.......... 11% $H_2O$ green....... | 57 | 1.60 | 24.7 | 7.0 |
| c.......... 14% $H_2O$ green....... | 57 | 3.00 | 25.0 | 7.6 |

*Air quench.

NOTE.—Flavor—a, b, and c all close in flavor—tarry, dirty, and earthy.

| | Feed rate (lbs./hr.) | Roasted | | |
|---|---|---|---|---|
| Extruded roast, 3/1 auger | | R.C. | Percent $H_2O$* | Percent S.S. | T.A. |
| a....... 6% $H_2O$ green..... | 5.6 | 60 | 4.2 | 33.8 | 13.7 |
| b....... 11% $H_2O$ green.... | 4.1 | 57 | 4.8 | 38.9 | 17.7 |
| c....... 14% $H_2O$ green.... | 4.4 | 58 | 6.6 | 41.0 | 18.0 |

*Air quench.

NOTE.—Flavor—a, b, and c no Robustas tarry notes, (a) sl. sour, (b) sour and (c) very sour.

As in the Pasadena roasts, increased moisture content produced dramatic increases in soluble solids, titratable acidity and cup strength. Unexpectedly, however, a marked improvement in the flavor quality of the low cost coffee was also apparent. This data confirms that high quality coffee is preferably dehydrated to optimize flavor while low cost coffee may be hydrated to further improve flavor. In each case, the application of mechanical pressure develops increased soluble solids reducing the amount of coffee necessary to prepare a roasted and ground brew or a soluble coffee product. Mechanical pressure roasts provide a 27 to 64 percent increase in soluble solids while removing objectionable "tarry" flavor notes of Robusta or low cost coffee. The development of acidity and sourness can be controlled by the initial green bean moisture content.

Green Bean Particle Size. Pasadena compression roasts were made for various green bean particle sizes. The particle sizes investigated were different Fitzpatrick Comminuting Machine grinds, flaked beans, and whole beans. The results obtained, roughly from smaller to larger overall particle sizes, are as follows:

| Sample Number | 1 | 2 | 3 | 4 | 5 |
|---|---|---|---|---|---|
| Green Bean Size | No. 1 Fitzpatrick Screen | | No.3 Fitzpatrick Screen | Flaked Beans No. 3 Roll Allis Chalmers Falker | No. Whole Beans |
| Green bean Moisture (%) | 3.1 | 6.9 | 3.1 | 8.6 | 6.9 |
| Roast Time (seconds) | 110 | 110 | 110 | 110 | 90 |
| Ram Temperature (°F) | 410 | 410 | 410 | 410 | 410 |
| Ram Pressure (psig) | 1400 | 1400 | 1400 | 1400 | 1400 |
| Roast Bean Soluble Solids (%) | 35.2 | 38.9 | 32.9 | 34.9 | 31.2 |
| Flavor Quality** | 4.2 | 3.5 | 4.5 | 4.0 | 4.0 |
| Cup Strength** | 5.0 | 7.0 | 4.0 | 5.5 | 4.3 |

** 65% recipe level

A trend appears to exist with finer particle size beans yielding somewhat higher soluble solids and greater cup strength. More coffee flavors of reasonable acceptability can be produced from all of the different particle sizes studied. Whole beans tended to char on the surfaces and a burned note was present in these brews. However, application of both a compressive force and shear force, as was accomplished in a Brabender extruder, enabled whole coffee beans to be roasted to a uniform and improved flavor as is evident from later examples.

Mechanical Pressure. In contrast to conventional Thermalo roasting, one of the strikingly different features of Pasadena Press and extruder roasting was the mechanical pressure applied to the roasting coffee. It had, in fact, been suggested that the greater soluble solids and cup strengths of Pasadena Press and Brabender roasts were brought about by the actual mechanical pressure on the coffee. A series of roasts was carried out in which mechanical pressure (and where necessary, time) was varied. It was found that at lower ram pressures the rate of roasting decreased (the time required to reach a given color end point increased). The following data was obtained on Medellin beans with all roasts taken to the same color end point:

| | | | | | |
|---|---|---|---|---|---|
| Ram Pressure (psig) | 2800 | 1400 | 700 | 350 | 200 |
| Green Bean Moisture (%) | 4.3 | 4.3 | 4.3 | 4.3 | 4.3 |
| Roast Time (seconds)*** | 75 | 150 | 150 | 175 | 300 |
| Ram Temperature (°F) | 410 | 390 | 390 | 390 | 390 |
| Roast Bean Soluble Solids (%) | 32.7 | 35.3 | 34.6 | 34.7 | 32.8 |
| Flavor Quality** | 4.5 | 4.5 | 3.4 | 2.5 | 2.0 |
| Cup Strength** | 4.7 | 5.0 | 4.0 | 3.5 | 3.2 |

** 65% recipe level
*** Different roasting times were required to achieve the same color end point.

The above data showed that decreasing ram pressures resulted in lower soluble solids, flavor quality and cup strength. It should be pointed out, however, that the soluble solids and cup strength remain considerably greater than that obtained by normal, conventional roasting of coffee. This data confirms the trend noted in extrusion roasting of coffee (shear forces also present) where soluble solids content increased as mechanical pressure was increased.

The exact mechanism producing the above results is not totally clear, but certainly would reflect the affect of pressure on the rate of heat transfer and, therefore, the rate of roasting as well as actual mechanical pressure on the coffee beans. Since it has been previously noted that decreasing roasting rates produced similar trends, some of the improvements in soluble coffee solids could be due to the time of roasting. However, results of two roasts above where ram pressure was the only variable, coupled with the entire Pasadena and Brabender pressure roasting studies, indicates that the affects noted above are to a degree a function of mechanical pressure itself.

The determination of the exact optimum force of compression and shear is routine to one of ordinary skill in the art. However, the discovery and application of mechanical compression and shear during roasting is unexpected and a chief advantage of this invention.

EXAMPLE IV

Low cost Robusta coffee was conventionally roasted in a Probat roaster and also roasted in the Brabender extruder. Analysis of the samples produced the following results:

| Sample | %H O | R.C. | pH/T.A. | % S.S. |
|---|---|---|---|---|
| Control | 1.9% | 65 | 5.6/10.0 | 24.5% |
| Extruder Roasted | 4.2% | 60 | 4.9/13.7 | 33.8% | a 38% increase in available S.S.

The roasted samples were ground to a perc or regular grind using a Hobart grinder and subjected to a single column extraction. Approximately 1,000 g. of roasted and ground coffee was placed in a column and hot water, at least 200°F, passed through the bed of coffee entering at the bottom of the bed and discharging at the top. When extract is observed exiting from the column, the discharge is interrupted to bring the column and its contents to 10–14 psig. The feed water is interrupted and the column maintained in a heated condition for 25 minutes. After this holdup, the hot water feed is continued until about 1,000 g. of coffee extract is obtained, normally over a ten minute period. The following concentrations were measured during collection of the extract:

| Time of Draw-off from Start (minutes) | Probat Extract (% solids) | Brabender Extract (% solids) |
|---|---|---|
| 2 | 17 | 19 |
| 3 | 13 | 17 |
| 4 | 11 | 15 |
| 5 | 10 | 14 |
| 6 | 10 | 13 |
| 7 | 10 | 12 |
| 8 | 9 | 11 |
| 10 | 8 | 9 |
| Total Extract Collected | Concentrational 1.5 Roasted Yield 11.5 | 15.4 15.4 |

Mechanical pressure roasted coffee was found to give a 34 percent increase in yield which, coupled with improved flavor for low cost coffees, represents appreciable cost savings in the manufacture of soluble coffee. The extract from the above extraction, or conventional coffee extraction of mechanically roasted coffee, is dehydrated by conventional means such as spray drying, freeze drying and the like.

EXAMPLE V

Robusta coffee was treated as in Example II. A 2/1 auger was employed and a temperature profile of 380°, 450°, and 460°F for zones 1, 2, and 3, respectively.

| feed rate (lbs/hr) | RC | % Brew Solids | % Soluble Solids | Flavor |
|---|---|---|---|---|
| 4.8 | 70 | 1.56 | 41 | Excellent upgrading, good acidity, no earthy tarry notes |
| 8.0 | 85 | 1.36 | - | Clean, acid, green sour |
| Probat Control | 70 | 0.96 | 28.3 | Typical Robusta earthy, tarry flavor |

When the temperature profile is changed to 385°, 400°, and 470°F for zones 1, 2, and 3, respectively, the following results were obtained:

| | | | | |
|---|---|---|---|---|
| 5.1 | 74 | 1.38 | 37.6 | Good cup quality—slightly sour |
| 5.8 | 84 | 1.11 | 33.4 | Definite upgrading compared to control |

When the temperature profile is changed to 400°, 425°, and 475°F for zones 1, 2, and 3, respectively, the following results were obtained:

| | | | |
|---|---|---|---|
| 5.5 | 54 | | 34.6 |
| 6.2 | 55 | | 32.1 |

When Santos beans are employed in place of the Robustas, large increases in soluble solids and brew solids are obtained.

When a decaffeinated green coffee blend (Sanka brand) is roasted at 390°, 430°, and 445°F for zones 1, 2, and 3, respectively, there was obtained a slightly under-roasted coffee having a 50 RC. When this experiment was repeated lowering the temperature in zones 1 and 2 by 5°F, and increasing the zone 3 temperature by 45°F to 490°F, it was necessary to appreciably increase the feed rate of coffee from a varidrive setting of 30 to 60 (8.0 lbs./hr.) to obtain the same roast color. Increasing the discharge zone temperature (zone 3) was found to develop a burnt flavor, illustrating that small changes in roasting temperature can produce appreciable flavor changes.

Blends of green coffee and small and broken green coffee were roasted as above and were found to have good roasted brew flavor. The small and broken bean roasting loss was not as great as experienced for conventional roasts.

EXAMPLE VI

Robusta coffee was treated as in Example V. A 1/1 auger was employed with an extruder barrel temperature profile of 425°, 470°, and 500°F for zones 1, 2, and 3, respectively.

| feed rate (lbs/hr) | RC | % Brew Solids | % Soluble Solids | pH | TA |
|---|---|---|---|---|---|
| 5.65 | 62 | | | 4.65 | 17.0 |
| Probat Control | 60 | | | 5.05 | 10.9 |

The flavor of the mechanically pressure roasted sample was found to be clean, sour, and acid, but not dirty or earthy compared to the control. Appreciably higher barrel temperature was necessary to roast employing the 1/1 auger.

When the temperature profile was changed to 475°, 500°, and 525°F for zones 1, 2, and 3, respectively, the following results were obtained:

| Auger RPM | feed rate (lbs/hr) | RC | % Brew Solids | % Soluble Solids | pH | TA |
|---|---|---|---|---|---|---|
| 30 | 4.0 | 42 | 1.36 | 29.8 | 4.5 | 16.6 |
| 32 | 4.2 | 56 | 1.26 | 29.8 | 4.6 | 17.9 |
| 34 | 4.8 | 64 | 1.12 | 29.8 | 4.7 | 19.4 |
| 36 | 5.3 | 70 | 1.12 | 27.8 | 4.6 | 17.4 |
| 38 | 5.9 | 74 | 1.11 | 28.3 | 4.4 | 14.9 |

Brew solids and acidity were developed and small increases in soluble solids content were noted compared to the Probat roasted control. Mechanical pressure was present using the 1/1 auger only through expansion of the coffee as it roasted. Greater mechanical pressure appears necessary to develop appreciable quantities of soluble solids. Unexpectedly, however, the roasting at low mechanical pressure did remove the tarry and earthy flavor normally characteristic of Robusta coffee.

When good grade coffee (Colombians) were roasted employing a temperature profile of 420°+ 20°, 470°± 30°and 470°± 30°F for zones 1, 2, and 3, respectively, similar results were obtained. The flavor of the coffee was changed with more sourness noted.

EXAMPLE VII

Robusta coffee was treated as in Example VI. A 3/1 auger was employed and a extruder barrel temperature profile of 400°, 425°, and 475°F for zones 1, 2, and 3, respectively.

| Auger RPM | feed rate (lbs/hr) | RC | pH | TA | % Brew Solids | % soluble Solids |
|---|---|---|---|---|---|---|
| 40 | 5.2 | 59 | 4.5 | 17.6 | 1.26 | 33.9 |
| 50 | 6.3 | 74 | 4.65 | 14.9 | 1.21 | 31.4 |
| 60 | 7.1 | 82 | 4.8 | 14.9 | 1.21 | 30.3 |
| 70 | 6.6 | 80 | 4.8 | 15.5 | 1.16 | 29.4 |
| Control | | | 4.8 | 15.9 | | 1.16 |

Appreciable acidity and soluble solids were developed as retention time in the extruder increased. All mechanically roasted samples were characterized as having good clean flavor lacking typical tarry and earthy Robusta flavor.

Control one pound Probat roasts of Robusta green coffee develop about 23-26 percent soluble solids as indicated below:

| RC | % Soluble Solids |
|---|---|
| 45 | 25.3 |
| 67 | 24.1 |
| 67 | 23.8 |
| 85 | 21.2 |
| 95 | 23.2 |

Comparison of the Probat roasts to the mechanical pressure roasts above indicates development of appreciable soluble solids without appreciable increase in acidity due apparently to the great mechanical pressure exerted on the beans during roasting.

EXAMPLE VIII

A series of samples were prepared to determine the total yield of soluble solids available from mechanically roasted coffee. A mechanically roasted sample having an eighty roast color (RC) and 4.7 percent roasted moisture was prepared employing a 2/1 auger, a barrel temperature of 400°, 430°, and 480°F for zones 1, 2, and 3, respectively, an auger speed of 45 R.P.M. and a feed rate of 4.8 lbs./hr. using the Model 250 Brabender extruder. A second sample was prepared having a 58 roast color and 4.0 percent roasted moisture employing a 2/1 auger, an auger speed of 38 R.P.M., a barrel temperature of 400°, 425°, and 475°F for zones 1, 2, and 3, respectively, and a feed rate of 5.0 lbs./hr. of green coffee using the Model 250 extruder. Control roasts of the same Robusta coffee were made employing hot air plant roasters. The following data was obtained:

Total Soluble Solids Yield Extrusion Roasted and Control 100% Robustas

| Roasted Sample | Atmospheric Soluble Solids | Autoclave Soluble Solids | Total Soluble Solids |
|---|---|---|---|
| 80 RC Extrusion Roast | 35.4 | 16.9 | 52.3 |
| 83 RC Control | 25.8 | 22.3 | 48.2 |
| 58 RC Extrusion Roast | 36.1 | 13.6 | 49.7 |
| 60 RC Control | 23.0 | 23.6 | 46.6 |

Results clearly indicate considerable improvement in the yield of soluble coffee solids may be obtained employing conventional percolation techniques. If conventional yields are desired, then an increase in flavor quality is possible through use of lower temperature extraction conditions.

The amount of atmospheric and autoclave soluble solids was determined by grinding and screening the roasted coffee to prepare a selected roasted and ground sample suitable for extraction, having 40 percent by weight −8 + 12 US Std. screen and 60 percent by weight −12 + 20 US Std. screen.

One part sample is mixed with four parts water and extracted at 212°F for 30 minutes. The mixture is centrifuged and the soluble solids content of the first recovered extract determined. One part cake from centrifugation is mixed with six parts water and maintained at about 212°F for ten minutes. The wash mixture is centrifuged and the solids content of the second recovered coffee extract determined. The atmospheric soluble solids content is then determined by adding the solids content of the first and second extracts.

The cake from washing is pressure extracted (autoclaved) using three parts water per part of cake at 350°F for thirty minutes. As before, a first extract and cake is obtained on centrifugation. The cake is washed as before for ten minutes and a second extract obtained. The autoclave solids is the total of the soluble solids determined for the first and second extracts.

The roasted coffee of this invention has great application to soluble coffee production. New flavor products are possible. Improvements in process throughout for percolation and grinders appears possible. Employment of conventional extraction conditions affords improved overall yield and higher concentration. For conventional yields of soluble coffee, the temperature necessary during extraction is lower and the product quality is improved.

Special techniques of percolation are applicable, such as extraction with dilute extract as described by Clinton, et al., U.S. Pat. No. 2,915,403, issued Dec. 1, 1959; as well as high temperature extraction as described by Guggenheim, U.S. Pat. No. 2,915,399, issued Dec. 1, 1951.

High solids percolation employing intercolumn heating within a series of extractors and/or reverse flow of extract through some of the extractors offers improved concentration of solids in recovered percolate; or if the same concentration is recovered, an improvement in product quality through use of lower temperatures during extraction.

Dilute extraction as taught by Bowden, et al., U.S. Pat. No. 3,089,772, issued May 14, 1963 offers better removal of soluble solids, higher concentrations of solids in the percolate or greater yield of soluble solids over that normally found with conventionally roasted coffee.

The differences between available atmospheric and autoclave solids in mechanically roasted coffee can also be utilized to improve percolation by employing split extraction techniques. For example, atmospheric and autoclave solids can be removed separately giving higher concentrations of solubles than normally obtained in the atmospheric extract. The autoclave extract is a smaller fraction of the total recovered extract and is easily concentrated and added to the atmospheric solids to produce an extract of improved concentration and a resulting product of improved flavor. Improved yield of solids is also possible if the concentration of solids is not increased apreciably over that recovered employing conventional split extraction techniques. Split extraction is also possible employing a pressure extraction of partially extracted coffee from conventional multicolumn extraction. Here, the same improvements in concentration, flavor, and yield are possible.

Mechanical pressure roasting may also be employed to produce roasted products which result in reduced foaming during soluble coffee processing and have improved extraction characteristics therefrom.

The processing of decaffeinated coffee and other coffees where pressure problems occur in the percolators may also be improved by use of mechanically roasted coffee.

EXAMPLE IX

The affect of mechanical pressure roasting on various types of green whole coffee was determined by preparing a number of samples of various roast color using the same procedure as generally followed in Example II. Control hot air roasts of the same roast color were compared to these experimental samples. A fixed volume of the beans after roasting was weighed for each of these samples and the bulk density of the whole roasted bean calculated. The whole bean was then ground in a standard coffee grinder set at percolator grind, and the determination of bulk density was again made on the ground sample. The following data was obtained:

| Coffee | RC | Whole Bean Density (g/cc) MP | Control | Percolator Grind Density (g/cc) MP | Control | Percolator Grind Density Change Δ |
|---|---|---|---|---|---|---|
| Colum- | 47±1 | | .331 | .329 | .307 | +.022 |
| bians | 60 | .303 | .352 | .314 | .319 | −.005 |
| Brazils | 60±3 | .303 | .335 | .337 | .310 | +.027 |
|  | 76±4 | .302 | .323 | .345 | .321 | +.024 |
| Sanka Brand | 40±1 | .303 | .313 | .328 | .314 | +.014 |
| Blend | 58 | .370 | .358 | .371 | .353 | +.018 |
| Ro- | 58±2 | .303 | | .334 | | |
| busta | | | .368 | | .339 | −.005 |
|  | | | .360 | | .323 | +.011 |
|  | 68 | .337 | | .372 | | |
|  | 74 | .273 | | .351 | | |
|  | 81±2 | .331 | | .375 | | +.015 |
|  | | .286 | | .357 | | −.003 |
|  | | | .399 | | .360 | |

MP - Mechanically pressure roasted
Control - Hot air roasted

The previous data indicates mechanical pressure roasting causes an increase in the ground density of green coffee from about 0.005 g. per cc to over 0.02 g. per cc. The degree of density increase is expected to be a function of the amount of mechanical pressure applied to the coffee bean and the variety of coffee bean being roasted. The difference in whole bean density over that of control is most likely due to its new form, for as previously noted, mechanically roasted coffee has a shiny surface appearance and a flattened form.

EXAMPLE X

Measurements of retention time were made using Robusta coffee. Roasting temperature was maintained at 400°, 425°, and 475°F for zones 1, 2, and 3, using the Model 250 Brabender extruder. The results that follow indicate the retention time of the coffee in the roaster varied between 45 seconds to 2 minutes depending on the green bean feed rate, degree of reduction in volume within the roaster (with the corresponding pressure changes), and compaction and slippage of the coffee within the roaster.

| Auger Ratio | Roasted Coffee Temperature (°C) | Green Coffee Feed Rate (lbs/hr) | Retention Time (seconds) |
|---|---|---|---|
| 1/1 | 183 | 8.3 | 50 |
| 2/1 | 192 | 4.7 | 130 |
| 2/1 | 200 | 7.7 | 73 |
| 3/1 | 194 | 4.8 | 126 |
| 3/1 | 205 | 8.4 | 108 |

Obviously, changes in the roasting temperature and in compaction produced by the rotating auger allow further variation in the feed rate and retention time of the coffee being roasted. In general, retention times between 20 seconds to 240 seconds are adequate when roasting at a temperature of at least 375°F and preferably above 390°F. A preferred temperature range is from 390°F to 520°F, and more particularly an average temperature of 420°F to 490°F.

EXAMPLE XI.—TYPICAL ROASTING CONDITIONS FOR VARIOUS TYPES OF GREEN COFFEE

| Sample | Green coffees, Probat and Extruder roasted product data | | | | | | Operating data for Extruder samples | | | | | |
|---|---|---|---|---|---|---|---|---|---|---|---|---|
| | R.C. | Percent H₂O | R.L. (D.B.) | pH-T.A. | Percent S.S. | Δ percent S.S. | RPM | Zone 1 | Zone 2 | Zone 3 | Product | Feed rate, #/hr. |
| Colombians-P | 46 | 3.4 | 8.3 | 4.7-15.0 | 25.0 | 26 | 40 | 450 | 490 | 510 | 410 | 4.2 |
| Colombians-E | 48 | 4.9 | 7.0 | | 31.4 | | | | | | | |
| Colombians-P | 60 | 4.4 | 5.8 | 4.8-14.9 | 24.4 | 29 | 40 | 440 | 475 | 495 | 397 | 4.2 |
| Colombians-E | 60 | 3.6 | 5.0 | | 31.4 | | | | | | | |
| Santos-P | 60 | 3.4 | 5.2 | 4.7-22.0 | 23.9 | 53 | 40 | 400 | 440 | 480 | 395 | 6.1 |
| Santos-E | 63 | 4.6 | 4.2 | | 36.6 | | | | | | | |
| Robustas-P | 60 | 3.1 | 6.0 | 4.7-18.0 | 25.0 | 48 | 38 | 400 | 425 | 475 | 392 | 5.0 |
| Robustas-E | 58 | 4.0 | 7.4 | | 37.0 | | | | | | | |
| Robustas-P | 83 | 3.3 | 5.0 | 4.9-15.0 | 24.5 | 46 | 45 | 400 | 430 | 480 | 398 | 4.8 |
| Robustas-E | 80 | 4.7 | 5.2 | | 35.8 | | | | | | | |
| Decaffeinated blend-P | 41 | 2.9 | 7.1 | 4.6-24.1 | 24.8 | 58 | 38 | 390 | 430 | 480 | 392 | 7.6 |
| Decaffeinated blend-E | 40 | 3.3 | 11.6 | | 39.3 | | | | | | | |
| Decaffeinated blend-P | 58 | 3.3 | 4.6 | 4.8-18.2 | 23.3 | 43 | 41 | 385 | 411 | 460 | 389 | 6.8 |
| Decaffeinated blend-E | 58 | 5.8 | 6.6 | | 33.3 | | | | | | | |

Note.—P=Probat air roasted coffee; E=Model 250 Brabender roasted coffee using 2/1 auger.

An advantage of mechanical pressure roasting is control of the type and degree of development of acidity and sourness. The flavor character of mechanical pressure roasted coffee acidity and sourness is more palatable than products prepared under pressure employing a gaseous medium containing water vapor. In prior processes, steam was employed to rapidly transfer heat and roast the coffee. Unfortunately, this did not provide a means for closely controlling the moisture content of the coffee being roasted nor the roasting environment since the quantity of steam was fixed by other process variables such as roast color and roasting time. Typical of the prior art pressure roasting patents are U.S. Pat. No. 3,106,470, issued Oct. 8, 1963 to Spotholtz; and U.S. Pat. No. 3,088,825, issued May 7, 1963 to Topolian, et al.

The present invention utilizes mechanical pressure to insure rapid conductive heat transfer and confinement of the coffee during roasting. This allows close control over the water content of the green coffee being roasted and the roaster environment which in turn provides control over the flavor and quantity of acidity or sourness developed.

The present invention also provides a confined environment not present in other rapid roasting methods such as fluid bed roasting (see U.S. Pat. No. 3,112,439, issued Feb. 25, 1964 to MacAllister, et al.), which apparently is necessary for appreciable increases in the quantity of water soluble coffee solids.

I claim:

1. A method of uniformly roasting coffee to increase soluble solids in a roasted product comprising:
   a. charging green coffee to an extruder;
   b. simultaneously subjecting the green coffee to heat, and mechanical forces of compression and shear within the extruder effective to roast the green coffee and effective to develop greater soluble solids than normally produced by conventional roasting;
   c. and recovering the roasted coffee.

2. The method of claim 1 wherein the coffee is whole green coffee beans.

3. The method of claim 2 wherein the coffee is partially roasted, sufficient to develop greater soluble solids than normally produced by conventional roasting and the partially roasted coffee is next conventionally roasted to the desired degree of roast.

4. The method of claim 1 wherein th coffee is subdivided green coffee beans.

5. The method of claim 4 wherein the green coffee is pre-treated by extraction of naturally occurring caffeine.

6. The method of claim 4 wherein the green coffee is pretreated by extraction of naturally occurring oils.

7. The product produced by the process of claim 1.

8. The method of claim 1 in which the roasted coffee is extracted with water to produce a water extract having improved soluble solids content over conventionally roasted coffee extracted in the same manner.

9. The method of claim 8 in which the extraction is carried out to recover both atmospheric extractable and autoclave extractable solids.

10. The method of claim 8 in which the roasted coffee is extracted with a dilute aqueous coffee extract.

11. The method of claim 8 in which the coffee is extracted employing intercolumn heating.

12. The method of claim 8 in which atmospheric and autoclave coffee solids are removed separately.

13. The method of claim 1 in which low cost coffee is roasted effective to reduce the tarry flavor normally associated with roasted low cost coffee.

14. The method of claim 13 in which the low cost coffee is Robusta.

15. The method of claim 1 in which the roasted coffee is further ground and packaged in a porous material effective to give faster extraction of solids during brewing and a greater brew concentration.

16. The method of claim 1 in which the roasted coffee is post-treated to reduce the acid content of the coffee.

17. The method of claim 1 in which roasting is carried out under an inert atmosphere.

18. The method of claim 1 in which the green coffee is pretreated to modify the moisture content of the coffee.

19. The method of claim 1 in which one or more coffee aromas are removed.

20. The method of claim 1 in which the coffee being roasted is subjected to a vacuum source during roasting to remove at least part of the gaseous roaster environment.

21. The method of claim 1 in which part of the heat is developed by compaction occurring within the extruder.

22. The method of claim 1 in which coffee oil is removed during roasting.

23. The method of claim 1 in which the development of acidity and sourness is controlled by controlling the green bean moisture content prior to roasting.

24. The method of claim 1 in which the temperature of the coffee beans prior to roasting is controlled within the range of 0°F to 350°F.

* * * * *

UNITED STATES PATENT OFFICE
CERTIFICATE OF CORRECTION

Patent No. 3,762,930     Dated October 2, 1973

Inventor(s) James P. Mahlmann

It is certified that error appears in the above-identified patent and that said Letters Patent are hereby corrected as shown below:

In Column 7, Line 14, after "allows" and before "of" the word ...recution... should read ...reduction...

In Column 10, Line 4, after "invention" and before "greater the words ...isnormally... should read ...is normally...

In Column 20, Line 1, before "Control" - add --Probat--.

In Column 22, Example X, Line 59, after "200" and before "73" ...7.7... should read ...7.6...

Signed and sealed this 20th day of August 1974.

(SEAL)
Attest:

McCOY M. GIBSON, JR.                    C. MARSHALL DANN
Attesting Officer                         Commissioner of Patents